(12) United States Patent  
Rollinger et al.

(10) Patent No.: US 7,640,744 B2
(45) Date of Patent: Jan. 5, 2010

(54) METHOD FOR COMPENSATING COMPRESSOR LAG OF A HYBRID POWERTRAIN

(75) Inventors: John Rollinger, Sterling Heights, MI (US); Alexander Zaremba, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 11/293,729

(22) Filed: Dec. 2, 2005

(65) Prior Publication Data

US 2007/0125083 A1 Jun. 7, 2007

(51) Int. Cl.
*F02B 33/44* (2006.01)
(52) U.S. Cl. ..................................... 60/605.1
(58) Field of Classification Search ................ 60/605.1, 60/608; 180/305, 65.2; 701/22; 903/942
See application file for complete search history.

(56) References Cited

U.S. PATENT DOCUMENTS

| | | | | |
|---|---|---|---|---|
| 3,015,934 A * | 1/1962 | Miller | .......................... | 60/601 |
| 4,805,409 A * | 2/1989 | Kobayashi | .................... | 60/597 |
| 4,901,530 A * | 2/1990 | Kawamura | ................... | 60/608 |
| 4,958,606 A * | 9/1990 | Hitomi et al. | ............... | 123/316 |
| 4,981,017 A * | 1/1991 | Hara et al. | ..................... | 60/608 |
| 5,064,423 A | 11/1991 | Lorenz et al. | | |
| 5,678,407 A * | 10/1997 | Hara | ............................ | 60/608 |
| 5,881,559 A * | 3/1999 | Kawamura | ................... | 60/597 |
| 5,916,130 A * | 6/1999 | Nakae et al. | .................. | 60/276 |
| 6,305,169 B1 * | 10/2001 | Mallof | ......................... | 60/608 |
| 6,318,083 B1 | 11/2001 | Machida et al. | | |
| 6,338,391 B1 * | 1/2002 | Severinsky et al. | ......... | 180/65.2 |
| 6,408,625 B1 * | 6/2002 | Woon et al. | .................. | 60/608 |
| 6,443,125 B1 * | 9/2002 | Mendler | ..................... | 123/316 |
| 6,478,100 B1 * | 11/2002 | Grewe | ........................ | 180/65.2 |
| 6,554,088 B2 * | 4/2003 | Severinsky et al. | ......... | 180/65.2 |
| 6,659,212 B2 * | 12/2003 | Geisse et al. | ............... | 180/65.2 |
| 6,705,084 B2 | 3/2004 | Allen et al. | | |
| 6,735,945 B1 | 5/2004 | Hall et al. | | |
| 6,847,189 B2 * | 1/2005 | Frank | ......................... | 320/104 |
| 6,901,324 B2 * | 5/2005 | Rose et al. | .................... | 701/54 |
| 6,931,850 B2 * | 8/2005 | Frank et al. | ................... | 60/608 |
| 7,028,793 B2 * | 4/2006 | Hu et al. | ..................... | 180/65.2 |
| 7,076,954 B1 * | 7/2006 | Sopko et al. | .................. | 60/607 |
| 2003/0188533 A1 * | 10/2003 | Jaster | .......................... | 60/608 |
| 2004/0016419 A1 | 1/2004 | Satou et al. | | |
| 2005/0266957 A1 * | 12/2005 | Kamijo et al. | ................. | 477/3 |

\* cited by examiner

*Primary Examiner*—Thomas Denion
*Assistant Examiner*—Douglas J. Duff
(74) *Attorney, Agent, or Firm*—Allan J. Lippa; Alleman Hall McCoy Russell & Tuttle LLP

(57) ABSTRACT

A method for compensating for the torque response of an internal combustion engine having a compressor coupled thereto for boosting cylinder air amount is presented. According to the method, a motor of a hybrid vehicle may assist the internal combustion engine to improve vehicle response. The method may improve driver perception of vehicle response and may reduce lag that can be associated with operating an engine having a compressor.

18 Claims, 6 Drawing Sheets

METHOD FOR COMPENSATING COMPRESSOR LAG OF A HYBRID POWERTRAIN

FIELD

The present description relates to a method for compensating for lag of an internal combustion engine in a hybrid vehicle. The method can adjust engine air amount and/or power output of a motor to improve the torque response of a vehicle.

BACKGROUND

One system that may be assembled to form a hybrid vehicle is described in U.S. Pat. No. 6,554,088. This system presents an internal combustion engine having a turbo charger that is part of a hybrid powertrain. The system can select tractive torque from an internal combustion engine and/or from an electrical motor. Further, the description mentions using a traction motor to provide additional torque when an operator calls for more power in an attempt to eliminate "turbo lag".

The above-mentioned system can also have several disadvantages. For example, the system apparently adjusts torque from a traction motor in response to an operator demand. However, if tractive motor torque is adjusted without regard to operating conditions of the turbo charger, the vehicle torque response may lag (follow behind) or lead (be ahead of) the compensation torque provided by the traction motor. This can result in a torque amount that may not match a desired torque amount and that may degrade vehicle drivability. Further, the torque provided by the traction motor may assist the internal combustion engine for a longer period of time than is desired. By increasing the traction motor assist time, additional energy may be consumed by the traction motor, thereby reducing the energy stored in the vehicle battery.

The inventors herein have recognized the above-mentioned disadvantages and have developed a method of controlling a hybrid powertrain having a compressor boosted internal combustion engine that offers substantial improvements.

SUMMARY

One embodiment of the present description includes a method to improve engine torque response of a hybrid vehicle powertrain, the hybrid powertrain comprising an internal combustion engine that may be coupled to a motor, the internal combustion engine having a compressor coupled thereto, the method comprising: adjusting a motor output torque in response to an operating condition of said compressor.

The torque response of hybrid powertrain, comprising at least a motor and a compressor boosted engine, may be improved by providing some portion of the motor torque in response to an operating condition of the compressor. For example, a compressor boosted engine (e.g., a turbocharged or supercharged engine) can have a torque response that lags behind a desired torque request. The torque response lag may be caused by an inability of the compressor to instantaneously increase flow through the compressor to the intake manifold. Consequently, the amount of air available for combustion may be less than desired at the beginning of a request to increase engine torque. However, it may be possible to more closely follow the requested torque by augmenting the engine torque with torque from a second source. Namely, a motor in the hybrid powertrain system may be capable of contributing torque to the vehicle driveline so that the internal combustion engine torque lag is less perceivable. By determining the compressor output flow or pressure, for example, motor torque may be controlled so that the combined engine and motor torque may more closely match the desired powertrain output torque. In this way, the motor torque can be adjusted as the compressor output changes, thereby improving overall torque response of the powertrain.

Further, another embodiment of the present description includes a method to improve engine torque response of a hybrid vehicle powertrain, the hybrid powertrain comprising an internal combustion engine that may be coupled to a motor, the internal combustion engine having a compressor coupled thereto, the method comprising: adjusting at least a cylinder air amount and a motor output torque in response to a compressor operating condition.

The torque response of a hybrid vehicle powertrain having a boosted internal combustion engine may be improved by compensating the cylinder air charge of the engine and by adjusting the motor output torque in response to a state of the internal combustion engine compressor. For example, the output of an internal combustion compressor may vary in response to operating conditions (e.g., barometric pressure, ambient temperature, compressor temperature, and compressor friction). If the motor torque is provided without regard to the output of the compressor, the torque response may lag or lead the desired torque. This may lead to degraded drivability and driver disturbance. However, by compensating cylinder air charge and motor torque in response to the state of the compressor, it may be possible to provide a more uniform torque response over a wider range of operating conditions.

By adjusting cylinder air charge to compensate for compressor lag, the duration and magnitude of torque provided by the motor to improve powertrain torque response may be reduced. In one example, a turbo charger may be used to increase engine power by compressing air entering the intake manifold. The turbo charger may allow the cylinder fuel amount to be increased while maintaining a desired air-fuel ratio. However, to increase the intake manifold pressure and cylinder charge, the turbo charger compressor relies on exhaust gases to spin the compressor turbine. And since cylinder charge drives exhaust pressure, the engine torque available from turbo charging may not be instantaneous after throttle opening. Consequently, the engine output torque may lag the desired engine torque. By increasing the cylinder air charge while the compressor flow is increasing, via adjusting valve timing for example, the cylinder torque output may increase, thereby bringing the engine output closer to the desired torque. Further, exhaust gas temperature and pressure may be higher at increased cylinder air charge levels so that turbine output may be increased over a shorter time interval. As a result, it may be possible to use less motor torque to meet the desired torque request.

The present description may provide several advantages. In particular, the approach may improve coordinated control between a boosted internal combustion engine and a motor. By determining a state of the internal combustion engine compressor, torque provided by the motor may be tailored so that the combined engine and motor torque may be more smooth and continuous. In addition, the method may reduce the amount of power consumed by the motor, at least during some conditions, so that the battery power may be used to propel the vehicle rather than reduce torque disturbances. Furthermore, the internal combustion engine air charge estimate may be improved since the motor may be controlled in a way that reduces the magnitude of engine speed changes, thereby lessening the amount of prediction that may be needed to determine cylinder air charge.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
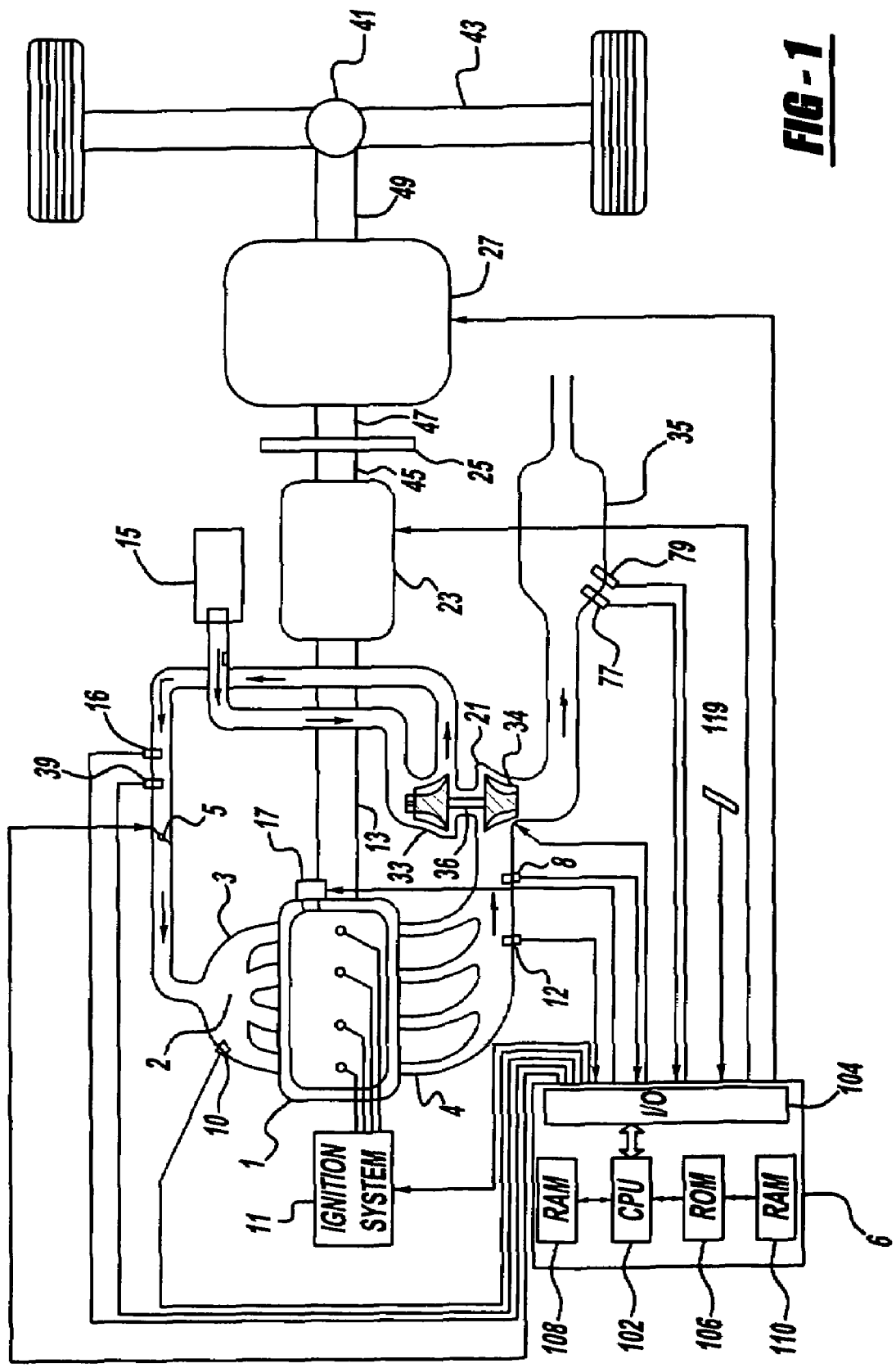
FIG. 1 is a schematic diagram of an example hybrid vehicle powertrain.

Referring to FIG. 1, internal combustion engine 1, comprising a plurality of cylinders, is controlled by electronic engine controller 6. Engine 1 includes combustion chambers (not shown) that are known communicating with intake manifold 3 and exhaust manifold 4 via respective intake valves and exhaust valves (not shown). The intake valves are operated via a cam (not shown) that may be indexed relative to a crankshaft position by cam phaser 17. Exhaust valves are operated using a fixed profile exhaust cam. Alternatively, the intake and/or exhaust valves may be operated by fixed cams or by variable event actuators. The variable event valve actuator may be a mechanical apparatus that is controlled by electrical or hydraulic components, or alternatively, the valve actuator may be electrically or hydraulically driven, or may be comprised of a combination of mechanical, electrical, and/or hydraulic components, electromechanical valves for example. In addition, the valve actuator may be capable of adjusting valve lift, valve phase (valve opening and/or closing position relative to a crankshaft position), or the combination of phase and lift. Some actuator designs may allow zero valve lift, a minimum lift, negative valve overlap between intake and exhaust valves, positive valve overlap between intake and exhaust valves, and/or combinations of lift and phase adjustment amounts. U.S. Pat. No. 6,145,483 describes one example of a variable valve actuator and is hereby fully incorporated by reference.

Intake manifold 3 is shown having manifold pressure sensor 10 coupled thereto, for sensing pressure in manifold plenum 2. Further, fuel injectors (not shown) may also be coupled to intake manifold 3 for delivering liquid fuel to engine 1 cylinders. Alternatively, the engine may be configured such that the fuel is injected directly into the engine cylinder, which is known to those skilled in the art as direct injection. Fuel is delivered to fuel injectors by a fuel system (not shown) including a fuel tank, fuel pump, and fuel rail (not shown). In addition, intake manifold 3 is shown communicating with electronic throttle 5. Mass air sensor 16 is located upstream of electronic throttle 5 and downstream of turbo charger compressor 33 and air filter 15. Alternatively, electronic throttle 5 may be located upstream of turbo charger compressor 33. Further, an intercooler may be inserted after turbo charger compressor 33 to cool compressed intake air.

Distributorless ignition system 11 provides ignition spark to engine 1 via respective spark plugs (not shown) in response to controller 6. Universal Exhaust Gas Oxygen (UEGO) sensor 8 is shown coupled to exhaust manifold 4 upstream of catalytic converter 35. Alternatively, a two-state exhaust gas oxygen sensor may be substituted for UEGO sensor 8. Exhaust manifold temperature is measured by temperature sensor 12, and/or estimated based on operating conditions such as engine speed, load, air temperature, engine temperature, and/or airflow, or combinations thereof.

Converter 35 can include multiple catalyst bricks, in one example. In another example, multiple emission control devices, each with multiple bricks, can be used. Converter 35 can be a three-way type catalyst in one example. Alternatively, the converter may be a NOx trap, Hydrocarbon trap, oxidation catalyst, or a selective oxidation catalyst.

Turbo charger 21 is shown in communication with to exhaust manifold 4 and intake manifold 3. Fresh air may be inducted at air filter 15, compressed by turbo charger compressor 33, and directed to intake manifold 3. Turbo charger turbine 34 is connected to turbo charger compressor 33 by shaft 36. During operation exhaust gases can flow from exhaust manifold 4 to turbo charger 21, where expanding exhaust gases can rotate exhaust turbine 34 and compressor 33. Exhaust gases are directed from turbine 34 to catalyst 35 for processing. Turbo charger 21 may be a variable geometry type or waste gate controlled.

Controller 6 is shown in FIG. 1 as a conventional microcomputer including: microprocessor unit 102, input/output ports 104, and read-only-memory 106, random-access-memory 108, 110 Keep-alive-memory, and a conventional data bus. Controller 6 is shown receiving various signals from sensors coupled to engine 1, in addition to those signals previously discussed, including: a position sensor 119 coupled to an accelerator pedal; mass air flow 16, a measurement (ACT) of engine air amount temperature from temperature sensor 39; catalyst oxygen concentration sensor; and catalyst temperature sensor.

Engine crankshaft is connected to starter motor 23 via output shaft 13. Starter motor 23 is connected to clutch 25 by shaft 45. Shaft 47 connects clutch 25 to traction motor 27. A battery (not shown) may source or sink current to traction motor 27 and/or to starter motor 23. Alternatively, engine 1 may be coupled to traction motor 27 via another device such as a transmission, for example, and/or arranged in another configuration that is not intended limit the scope or breadth of the description. Drivetrain power is output from motor 27, engine 1, and starter 23 to axle 43 via differential 41.

The hybrid powertrain configuration shown in FIG. 1 is presented for illustration purposes and is not intended to limit the scope or breadth of the description. For example, the present description may be used in parallel or serial drivetrain configurations and/or in powertrains that include diesel or gasoline engines.

Figure 2:
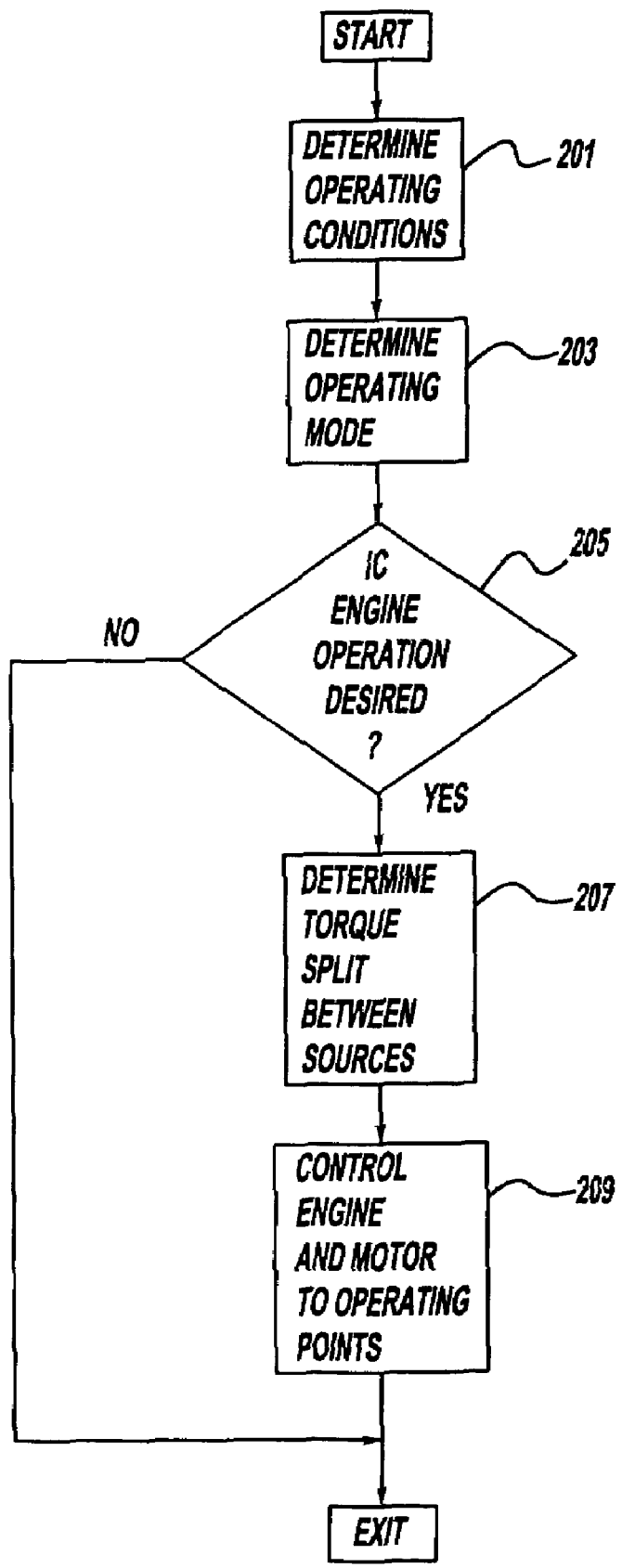
FIG. 2 is a flow chart of an example hybrid powertrain torque control routine.

Referring to FIG. 2, a flow chart of an example hybrid powertrain torque control routine is shown. A hybrid powertrain may have two or more potential torque output devices and is hereby defined as the combination of an internal combustion (IC) engine with a secondary power system. For example, a hybrid powertrain may comprise a combination of an IC engine and an electric motor, or an IC engine and a hydraulic motor. These powertrain configurations may allow a variety of control modes. For example, it may be possible to solely operate the internal combustion engine, operate the engine and motor simultaneously at different speeds, operate the engine and motor simultaneously at the same speed, operate the motor and engine at different torque output amounts, and/or solely operate the motor. As such, it may be desirable to coordinate torque control between the engine and the motor.

Referring to step 201, engine and motor operating conditions may be determined. Sensors and/or actuator may be monitored to determine powertrain operating conditions so that a desired torque output may be achieved. For example, driver demand torque can be determined by interrogating pedal position sensor 119 output voltage or current and then transforming the sensed voltage or current to a torque demand by way of a predetermined function or table. Observed engine operating conditions may include coolant temperature, engine speed, cylinder air amount, catalyst oxygen level, catalyst temperature, air charge temperature, exhaust temperature, engine mass air flow, intake manifold pressure, and cam shaft angle. Motor operating conditions may include current, voltage, hydraulic pressure, motor temperature, hydraulic oil temperature, and/or motor speed. Furthermore, hybrid battery conditions such as battery temperature and state of charge may be determined in step 201. The routine proceeds to step 203.

In step 203, the powertrain operating mode is selected. Operating conditions from step 201 may be used to determine the powertrain operating mode. In one example, a table of requested powertrain speed/torque operating points may be sectioned into predetermined modes (e.g., motor mode, engine/motor mode, or engine mode). An operating mode may be determined by indexing the table by using desired driver demand torque and powertrain output speed. Furthermore, the operating mode output from the table can be modified by considering the state of the motor, engine, battery state of charge, torque rate of change, and catalyst state (i.e., temperature and/or oxygen state). For example, if operating conditions are used to index a table location calling for motor operation, the mode may be changed to engine/motor state if the battery state of charge is below a desired level. The routine proceeds to step 205.

Referring to step 205, the routine determines if at least engine operation is to be used. If the operating mode determined in step 203 includes engine operation the routine proceeds to step 207. If not, the routine proceeds to exit.

Referring to step 207, the routine determines the torque split between the engine and the motor. In one example, motor and engine torque may be determined by requesting a portion of the driver demand torque from the motor and a portion from the engine. In other words, driver demand torque may be the sum of engine and motor torque acting through a transmission or driveline to produce wheel torque or conversely driver demand torque may represent wheel torque and engine and/or motor torque may be determined in response to a desired wheel torque. For example, a function holding certain levels of motor torque can be indexed by requested driver demand torque and by motor output speed. The desired output motor torque can be scaled based on the battery state of charge. In one example, if the battery is charged above 50% the full torque capacity of the motor may be used. For a battery charged between 50% and 40% a reduction in motor torque capacity will result. Consequently, during certain operating conditions the balance of the requested torque may be provided by the engine so that the torque request may be split between the motor and the engine. In this way, the driver demand torque may be split into a desired engine torque and a desired motor torque.

Another example driveline configuration may be such that the engine provides some proportion of current to the traction motor and/or battery via an alternator/generator. Current originating from engine or battery can be delivered to the traction motor to provide the tractive wheel torque. In this configuration, the engine may operate at one or more nearly steady speed/load operating points, transitioning between operating points based on operating conditions, for example. The engine torque can be a function of a proportion of the current requested to power the traction motor and the battery may provide the remainder of the requested traction motor current. The routine proceeds to step 209.

In step 209, the engine and the motor can be controlled to generate the desired driver demand torque. The traction motor torque can be controlled by the amount of current and voltage that may be supplied to the traction motor. Current may be supplied by an inverter or from other power electronics in response to the torque split determined from step 207. Typically, the motor can respond more quickly to requested torque changes than an internal combustion engine.

The engine throttle position, fuel amount, valve timing, boost pressure, and spark advance can be determined from look-up tables that may be indexed by engine speed and the engine torque demand determined in step 207. During transient conditions the method described in FIG. 3 can provide engine air flow and torque control so that drivetrain response and emissions may be improved. Engine controller 6 outputs control signals to operate the engine. The routine exits.

Figure 3:
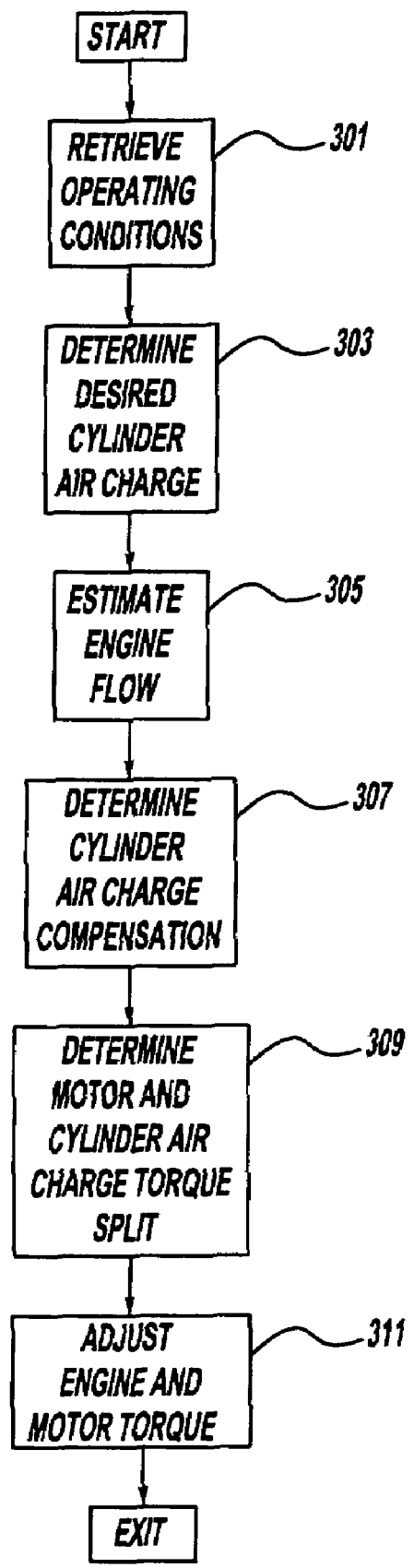
FIG. 3 is a flow chart for lag compensation of a hybrid vehicle.

Referring to FIG. 3, a flow chart of an example method to control and compensate cylinder air flow is shown. An internal combustion engine that employs a compressor (e.g., turbo charger or supercharger) may experience a torque response lag that may be due to, at least in part, the rate at which flow can change through the compressor. In other words, the compressor flow rate may not respond as quickly as may be desired to a change in operating point. Therefore, it may be desirable to compensate for compressor lag to improve response of a hybrid powertrain. FIG. 3 shows one method that may use cylinder air charge and/or motor torque to reduce the effect of compressor lag of a hybrid powertrain. In another embodiment, the engine torque response lag may be attributed to other devices that may be used to change cylinder air charge, cam phasors for example. The lag of this type of device may be compensated in a similar manner.

In step 301, engine and motor operating conditions are retrieved from step 201 of FIG. 2. These operating conditions can be used to modify control parameters that adjust compressor lag compensation. The routine proceeds to step 303.

In step 303, desired cylinder air charge is determined. The powertrain controller can command varying amounts of torque from the engine and/or the motor to meet the operator wheel torque demand. The engine torque demand may be related to vehicle wheel torque and engine air and/or fuel amounts by the following equation:

$$TWHL = (TMOT \cdot R_m) + \left[ \left( \frac{Ind\_Tor - fengT(N, Des\_am - Cyl\_am) \cdot \frac{1}{FNSPKRTO(SAF)}}{} \right) \right] \cdot R_e$$

Where TWHL is the vehicle wheel torque, FNSPKRTO is a function that relates spark retard from MBT (minimum spark for best torque) to a corresponding torque reduction for engines utilizing spark ignition, TMOT is the electric motor torque, $R_m$ is the gear ratio between the electric motor and the vehicle wheels, Ind_Tor is the desired indicated engine output torque, fengT is a function that describes engine torque based on engine speed and engine air amount, N is engine speed, Des_am is desired engine air mass, Cyl_am is the air mass through the cylinders (i.e., the lagging desired engine air mass), and $R_e$ is the gear ratio between the engine and the wheels. In the before-mentioned equation, fengT is used to determine the torque lag that may be associated with the turbo charger, intake manifold filling, and/or other rate limited actuators (e.g., cam phasors).

In one example, the amount of engine torque commanded by the powertrain controller may be described in terms of engine brake torque by the following equation:

$$\text{Ind\_Tor} = \text{Dsd\_Brk\_Tor} + \text{Fric\_Tor} + \text{Loss\_Tor}$$

Where Ind_Tor represents the desired indicated engine torque, Dsd_Brk represents the desired engine brake torque, Fric_Tor represents the engine friction torque, and Loss_Tor represents the engine torque losses (e.g., accessories such as electrical loads and/or power steering pumps). The engine friction torque and losses may be determined by interrogating empirically based tables and/or functions that describe operation of the engine over various operating conditions.

Note that the driver demand torque may be limited and/or filtered to improve the drivability of the vehicle. For example, if a driver changes a torque demand in an abrupt manner, it may be possible to limit and/or filter the rate of the driver demand torque so that a rapid torque response of the system does not degrade vehicle drivability.

Cylinder load (i.e., the fraction of theoretical cylinder air capacity at standard temperature and pressure, e.g., 0.5 load corresponds to half the theoretical cylinder air capacity of a cylinder) for an engine having cylinders that are inducting substantially equal (e.g., within ±10% of each other) air-fuel mixtures into all cylinders may be determined by the following equation:

$$\text{Load} = FNLOAD\left(N, \left(\text{Ind\_Tor} \times \frac{1}{FNSPKRTO(SAF)}\right)\right)$$

Where FNLOAD is a predetermined table that outputs a fractional cylinder load (e.g., 0.5), and that may be indexed by engine speed and corrected indicated torque.

Cylinder air charge may be determined by multiplying the desired engine load by the theoretical cylinder air charge capacity at standard temperature and pressure. The desired air flow through the engine may be determined by the following equation:

$$\text{Des\_am} = sarchg \times N \times \frac{numcyl}{2} \times \text{Load}$$

Where Load is cylinder load determined by the above-mentioned method, numcyl is the number of engine cylinders, N is engine speed, and sarchg is the theoretical cylinder air charge at standard temperature and pressure. The routine proceeds to step 305.

In step 305, estimated engine air flow is determined. The air flow through the engine may be described as a function of throttle position, compressor outlet pressure, and engine speed. The compressor outlet pressure may be directly measured or may be modeled. One example compressor output model can be developed by the following equations and relationships:

$$\text{EXAM} = \text{Cyl\_am} \times SQRT\left(\frac{(EXT + 273)}{T_1}\right)$$

Where EXAM is the exhaust air mass, Cyl_am is the air flow through the engine cylinders, EXT is the exhaust gas temperature, and $T_1$ a selected operating temperature. Note that this equation assumes all cylinders are exhausted into a common exhaust manifold.

For a variable geometry turbo charger, the exhaust back pressure at the inlet of the exhaust turbine may be determined by the following function:

$$TBP = \text{Offset} + F1(VGT)(\text{EXAM}) + F2(VGT)(\text{EXAM}^2) + F3(VGT)(\text{EXAM}^3)$$

Where TBP is the steady-state pressure on the inlet side of the turbine, VGT is the vane position of the variable geometry turbo charger, and F1-F3 are empirically determined coefficients. For a turbo charger having a waste gate the exhaust back pressure at the turbine may be determined from:

$$TBP = \text{Offset} + \text{EXAM} \cdot \text{Slope} + \text{EXAM}^2 \cdot \text{Quadratic} + \text{EXAM}_3 \cdot \text{Cubic}$$

Where Slope is an empirically determined open waste gate coefficient or a closed waste gate coefficient, Quadratic is an empirically determined open waste gate coefficient or a closed waste gate coefficient, and Cubic is an empirically determined open waste gate coefficient or a closed waste gate coefficient.

Turbo charger turbine speed can be related to the pressure drop across the turbine. Further, the pressure drop across the turbine can be determined from the absolute exhaust pressure at the inlet side of the turbine and the pressure downstream of the turbo charger which may be assumed to be barometric pressure. The absolute pressure at the inlet side of the turbine can be approximated by adding the barometric pressure to TBP. In an alternative embodiment, the pressure downstream of the turbo charger may be determined by iteratively solving a back pressure algorithm that determines pressure downstream of the turbo charger from the exhaust gas mass flow rate, catalyst brick flow characteristics, and the barometric pressure.

Figure 4:
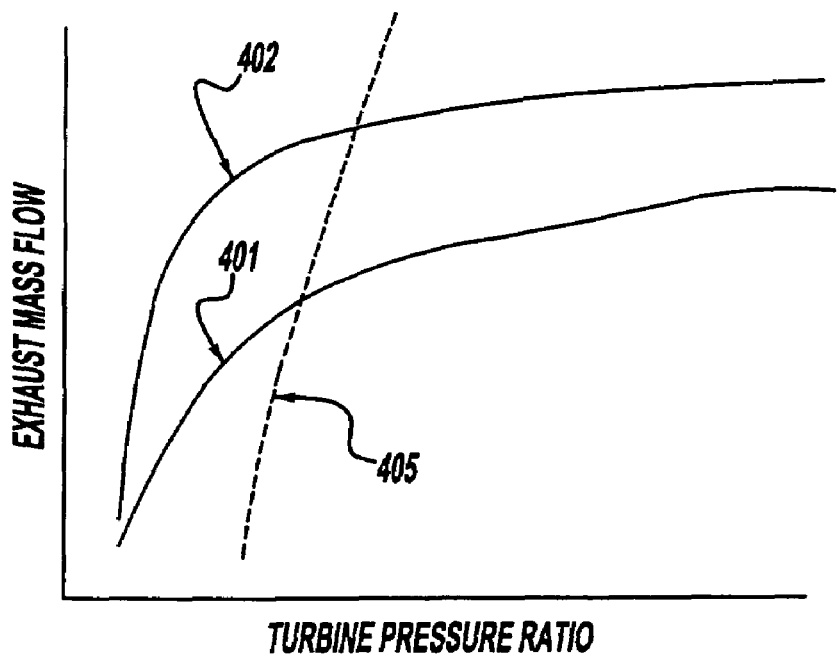
FIG. 4 is an example plot of a turbo charger turbine speed map.

The turbine speed may be determined by indexing empirically determined functions and/or tables that describe the relationship between exhaust mass flow, turbine pressure ratio, and turbine speed (See the description of FIG. 4 for an example of the relationship between exhaust mass flow, turbine pressure ratio, and turbine speed). For variable geometry turbo chargers the turbine speed can be determined by adding an additional factor or dimension to the describing functions, namely the position of the turbine vanes. The turbine speed look-up functions may be expressed as:

$$Ntwg = FWGT(\text{EXAM}, (TBPA/BP))$$

or $$Ntvgt = FVGT(\text{EXAM}, (TBPA/BP), VGT\_\text{Pos})$$

Where Ntwg represents the speed of a turbine for a waste gate type of turbo charger, Ntvgt represents the speed of a variable geometry type turbo charger, TBPA is the absolute exhaust pressure at the turbo charger inlet, BP is the barometric pressure, and VGT_Pos is the position of the variable geometry turbo charger vanes.

The turbine speed and the compressor speed are equal or a multiple of one another since the turbine is coupled to the compressor via a shaft and/or gears. The compressor output pressure may be related to the speed of the turbine shaft and the mass flow rate through the compressor. This relationship can be expressed by a compressor map that may be described by a function or set of empirically mapped points, see FIG. 5 for example. The compressor air mass flow rate can be determined by monitoring the output of MAF sensor 38 and compensating the MAF output for temperature. The output of the compressor map (i.e., pressure) can be compensated for barometric pressure and then may be used to determine the flow through the throttle via the following expression:

TP_FLOW=FThrottle(Tangle,TPdrop)

Where TP_FLOW is the Flow rate through throttle 5, FThrottle is a function or map that describes the flow through the throttle, Tangle is the throttle angle or position, and TPdrop is the temperature and barometric pressure compensated pressure drop across the throttle body. The throttle flow can be used to determine the air mass flow through the engine cylinders using the following equation:

$$\text{Cyl\_am} = \frac{FK(k)}{FK(k-1)} \cdot (1 - FK(k)) \cdot \text{Cyl\_am}(k-1) + (FK(k)) \cdot \text{TP\_FLOW}(k)$$

Where Cyl_am is the air mass flow through the engine cylinders, k is a variable describing the sample or calculation number index, FK is a filter coefficient used to describe manifold filling. The manifold filter coefficient may be determined as described in U.S. Pat. No. 5,331,936, which is hereby fully incorporated by reference. Assuming that during steady state engine operation the mass flow rate of air entering the engine is equal to the air mass flow rate entering the cylinders, and to the turbo charger compressor mass flow rate through the turbo charger, and to the exhaust air mass flow rate then the mass air flow through the engine can be considered to be the desired mass air flow through the engine, thereby removing the mass air flow from the analysis. The cylinder air charge that may be compensated for intake manifold filling may then be determined from the above cylinder air mass equation without using MAF sensor reading. The amount of additional air flow into the engine used to compensate for turbo charger lag may then be determined by:

Delta_air=Air_gain·(Des_am−Cyl_am)

Where Delta_air is the amount of additional air mass that is to be provided to compensate for turbo charger lag by adjusting the throttle command, Air_gain is a predetermined gain that may be varied by engine speed, turbine speed, engine coolant temperature, cylinder load, and/or other engine operating conditions, for example.

The engine has a limited ability to induct additional air depending on the engine operating conditions, such at the engine speed, valve timing, and throttle position. If air flow through the engine is choked by the throttle or valves then air flow may be increased by changing the valve timing, valve lift, or throttle opening amount. On the other hand, if the throttle and/or valve restriction is slight then there may be little opportunity to increase air flow through the engine by further adjusting valve timing or opening the throttle. Therefore, the Delta_air variable can be limited as a function of engine speed and throttle position or alternatively as a function of engine speed and cylinder load, for example, so that a realizable cylinder air charge amount may be requested.

In addition, the before-mentioned Air_gain term may be scheduled based on cylinder load and turbo charger lag. This allows the throttle and/or valve timing and/or lift to be adjusted such that when turbo charger lag is large and cylinder load is low, the throttle and/or valve timing/lift may be adjusted at a higher rate of change. On the other hand, if the turbo charger lag is small and the cylinder load is large, the throttle and/or valve timing/lift may be adjusted at a lower rate of change. In yet another example, if the turbo charger lag is large and the cylinder load is large, the throttle and/or valve timing/lift may be adjusted at a low rate of change. In still another example, if the turbo charger lag is small and the cylinder load is small, the throttle and/or valve timing/lift may be adjusted at a low rate of change. This method can control the amount of actuator over-shoot and cylinder air charge variation.

The additional amount of torque provided by the air charge compensation may be determined by:

Delta_tor=Des_Brk_Tor−fengT(N,Des_am+Delta_air)

Where Delta_tor is the amount of additional torque that can be delivered by the engine by adjusting the throttle or valve timing to compensate for turbo charger lag, fengT is a function that describes engine torque based on engine operating conditions, such as speed and air mass, for example. The variable N represents engine speed. The routine proceeds to step 309.

In step 309, the amount of lag compensation provided by the electric motor is determined. In one embodiment, the amount of torque supplied by the electric motor can be determined as a function of the motor speed and current.

The available motor torque, TMOT_Avl, may be determined from the motor speed and the amount of current available to the motor. And since at least some of the motor current may be supplied by the battery it may also be desirable to consider the state of charge of the battery when determining the available motor torque. By determining the battery state of charge it may be possible to determine how much power (rate of current and voltage delivered) the battery may supply to the electric motor for turbo charger lag compensation. Thus, the available motor torque may be a function of the motor and battery operating conditions. In one example, the motor torque command may be determined by selecting the minimum of equations (1) and (2):

$$TMOT_{cmd} = \frac{TWHL - (\text{Ind\_Tor} - \text{Delta\_tor}) \cdot R_e}{R_s} \quad (1)$$

or $$TMOT_{cmd} = TMOT\_Avl \quad (2)$$

When equation one is selected the motor torque demand can be used to supply a portion of the wheel torque that may not be supplied by the engine. That is, the motor torque may act as an additive torque to the engine torque so that the wheel torque demand may be met. Furthermore, since the Delta_tor term may be influenced by compressor and/or engine operating conditions, the compressor and/or engine operating conditions may influence the motor torque. When equation two is selected the motor torque output capacity is limited by the amount of available motor torque. Of course, other methods of selecting engine and motor torque are possible and as such the before-mentioned method is not intended to limit the scope or breadth of the current description. The routine proceeds to step 311.

In step 311, the motor torque and engine torque are adjusted. The Delta_air term from step 305 can be added to the desired engine air amount so that the throttle, valves, or other engine air amount adjusting device may alter the engine air amount and compensate for lag that may be present between the desired and actual engine air amount. In one example, the throttle command position may be adjusted in response to the outlet pressure of a turbo charger. In another example, the valve timing may be adjusted in response to the outlet pressure of a turbo charger. In still another example, the valve lift of a variable event valve actuator may be adjusted in response to the outlet pressure or flow from a air intake compressor.

The motor torque can also be adjusted in step 311 by adjusting the current and/or voltage applied to the traction motor. Depending on the control objectives the motor torque may be increased or decreased to compensate for lag in the torque response and/or to provide a portion of the desired wheel torque. After adjusting the motor torque the routine proceeds to exit.

Referring to FIG. 4, an example plot of a turbo charger speed map is shown. The x-axis represents the pressure ratio across the turbo charger turbine. The y-axis represents the mass flow rate of exhaust through the turbine. Curves 401 and 402 represent the pressure versus flow characteristics of an example variable geometry turbine at selected turbine vane positions. Curve 405 illustrates the intersection of turbine pressure ratio and exhaust mass flow for a constant engine speed. Other turbine speeds can be represented by similar lines that describe the pressure ratio and flow characteristics of a turbine at a constant speed. The intersection of curves 402 and 405 describes a unique operating point that can be used to determine the turbine speed. For example, a table or function can be constructed such that it outputs a unique turbine speed when indexed by a turbine pressure ratio and an exhaust mass flow rate. As a result, the turbine speed may be inferred without imposing a substantial computational load on the powertrain control module. Furthermore, the relationship described by FIG. 4 can be used as described by the method of FIG. 3 to determine compensation for system lag.

Figure 5:
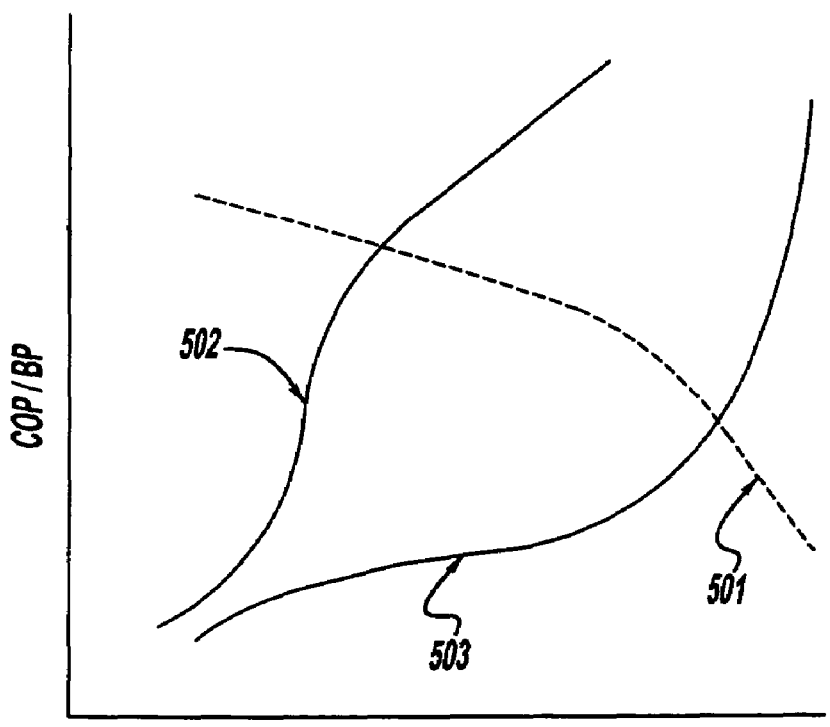
FIG. 5 is an example plot of a turbo charger compressor map.

Referring to FIG. 5, an example compressor map that relates compressor air flow and compressor speed to the outlet pressure of the turbine is shown. Curve 501 represents a line of constant compressor speed at various compressor flow rates and outlet pressures. Curves 502 and 503 represent the boundaries of compressor operation so that compressor surge may be reduced, for example. The figure shows that for a selected compressor flow rate and compressor speed, a unique outlet pressure may be determined. This allows the evolution of compressor outlet pressure to be determined as the exhaust flow influences the turbine and compressor speed.

Figure 6:
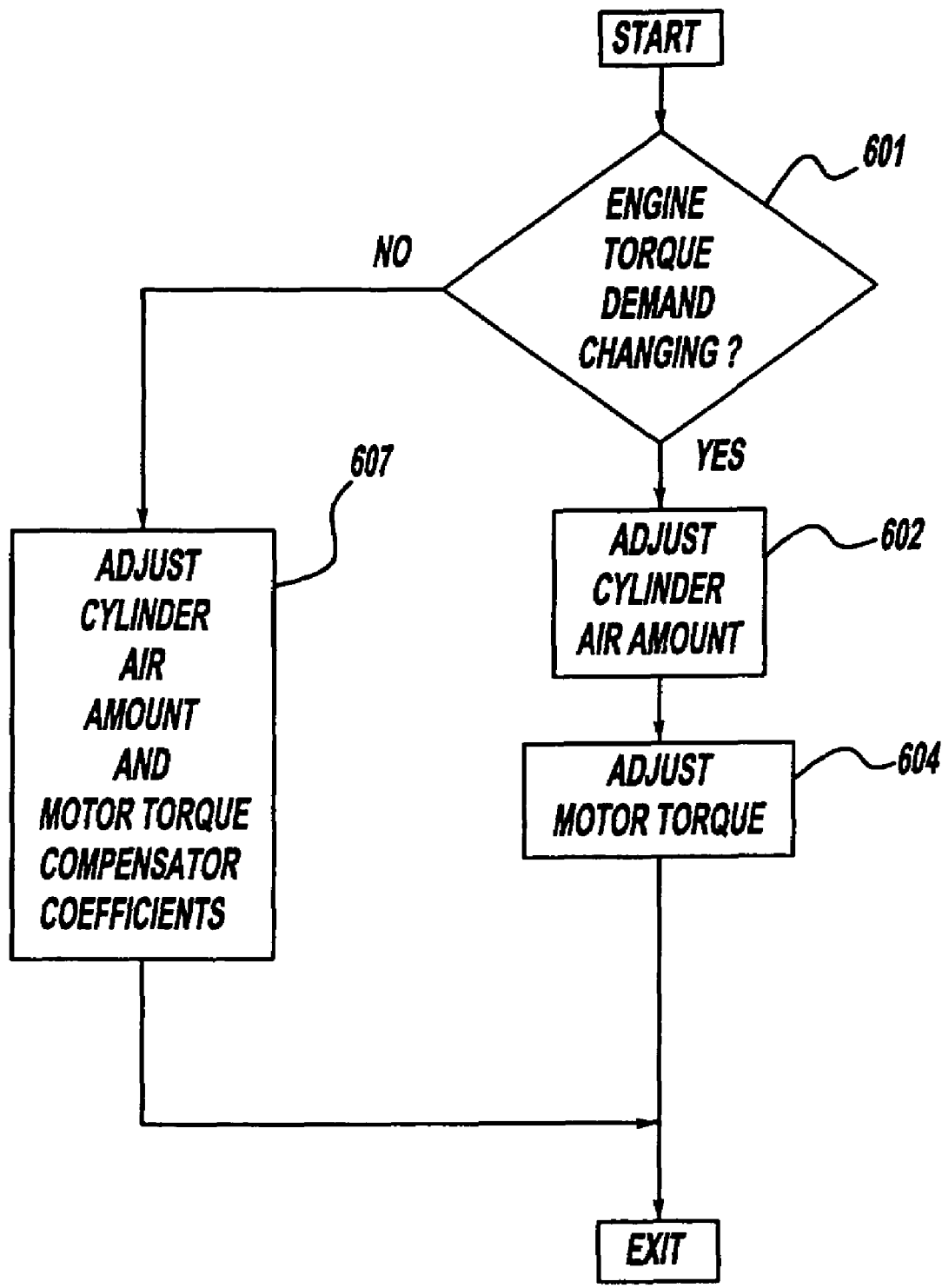
FIG. 6 is a flow chart for an alternative method of lag compensation for a hybrid vehicle.

Referring to FIG. 6, a flow chart of an alternative method to compensate for turbo charge is shown. In step 601, the routine determines if a change in engine torque is requested. If the engine torque is varying by more than a predetermined amount the routine proceeds to step 602, otherwise the routine proceeds to step 607. Note that the above-mentioned predetermined change in engine torque may vary in response to engine speed and/or cylinder load, for example.

In step 602, the cylinder air amount can be adjusted. The cylinder air amount may be adjusted via throttle opening amount, valve timing and/or lift, EGR amount, or by combinations or sub-combinations of the before-mentioned methods. The amount of the adjustment may be made dependant on the rate of change of engine torque and/or other engine operating conditions (e.g., engine temperature, battery state of charge, electric motor torque capacity and/or reserve, barometric pressure, air temperature, boost pressure, turbo charger turbine speed, time since start, etcetera). In one example, the change in engine torque can be used to index functions or tables that contain control variables that may alter the system response. These control variables may be used to change the response of actuators (e.g., throttle, electrically actuated valves, cam phasors, etcetera) so that other system lags (e.g., turbo charger lag, cam phasor lag, etcetera) may be compensated. An example lead compensator of the following form may be used to adjust cylinder air charge and/or motor torque:

$$Y(k)=\alpha \cdot U(k)+\beta \cdot U(k-1)+\delta \cdot Y(k-1)$$

Where Y is the output variable of the lead compensator, U is the system input variable, k is a variable describing the sample or calculation number index, and coefficients $\alpha$, $\beta$, $\delta$ are predetermined and may vary with engine operating conditions, for example. Of course, alternative compensator designs may be used in place of the before-mentioned design and as such the described compensator is not meant to limit the scope or breadth of the description. The selection of the coefficients may be based on the stability of the system and drivability constraints. In addition, it is also possible to compensate a fraction of the total number of cylinders for the system delays. However, cylinders are usually compensated in order of firing until the lag period has expired. The routine proceeds to step 604.

In step 604, electric motor current may be adjusted in response to the engine torque demand. Similar to step 602, a lead compensator of the before-mentioned form may also be used to compensate the electric motor torque demand. Alternatively, another compensator design may be used such that the before-mentioned compensator is not meant to limit the breadth or scope that the electric motor compensation method. The coefficients of the compensator may be empirically determined and may be a function of system operating conditions (e.g., operator demand, engine temperature, boost pressure, turbo charger outlet pressure or flow, turbo charger turbine speed, battery state of charge, electric motor torque capacity and/or reserve, barometric pressure, air temperature, time since start, and/or engine torque). The selection of the coefficients can influence the magnitude and duration of the motor response. The routine exits after adjusting engine air amounts and motor torque amounts.

Note that coefficients of the compensators may be adjusted during certain operating conditions so that the compensator does not provide any lead to the system. For example, if the motor has no reserve capacity (i.e., the motor is producing substantially (±5%) its peak torque at a certain operating point or the torque capacity of the motor may be limited by the battery state of charge) then some of the coefficients may be reduced to zero or near zero so that a small amount or no lead is provided to the system. In addition, the before-mentioned compensators may be used to increase or decrease engine and/or motor torque at an increased rate. Further, the coefficients may be selected such that during an increasing torque demand the amount of engine and/or motor torque increase may be based on the operating conditions or the engine and/or turbo charger (e.g., turbo charger outlet pressure, turbo charger outlet flow rate, driver torque demand, engine speed, turbo charger turbine temperature, and engine temperature).

In step 607, the coefficients of the cylinder air amount and motor torque compensators are adjusted for steady state torque demand conditions. That is, the coefficients of the before-mentioned compensators may be adjusted for operating conditions where the operator torque demand is substantially (±5% of demand) constant. Note that the steady state coefficients may vary between steady state operating conditions so that if a change in torque does occur there may be compensation that may be more suitable for a torque disturbance at particular steady state operating condition.

Figure 7:
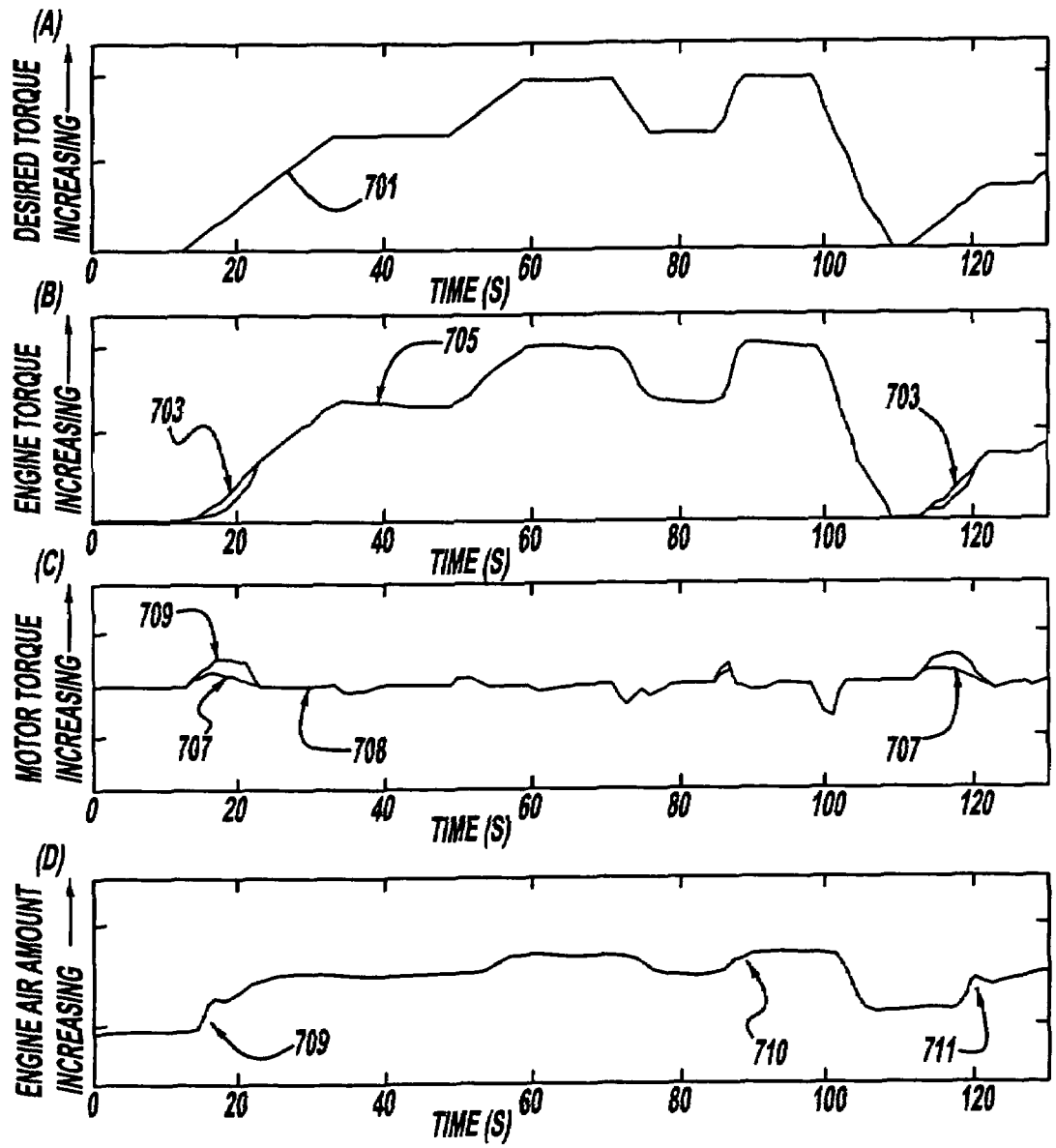
FIG. 7 is an example plot of signals that illustrate lag compensation for a hybrid vehicle.

Referring to FIG. 7, an example plot of signals that illustrate engine lag compensation is shown. Graph (a) shows an example desired wheel torque signal 701. This signal may be generated by pedal position sensor 119, by the combination of several signals, or by a device that can demand a powertrain torque request, an engine speed controller for example.

Graph (b) illustrates several examples of simulated engine torque output in response to the demand of Graph (a). The response of an engine without torque compensation may be illustrated by curve 705. This torque response lags the output of compensated engine torque response in the 20 second and 115 second regions. This torque response comes close to matching the torque request at higher requested torque demands. This type of behavior is common for turbo charged engines where turbo charger lag occurs at lower engine speeds and then decreases after the turbo charger has time to reach a more efficient operating point. Further, curve 705 indicates that the engine is providing the majority of the requested torque during the operating period. However, it is also possible to use a smaller fraction of engine torque and an increased amount of motor torque to meet the driver demand torque. The powertrain controller may determine the fraction of desired torque that comes from the engine and from the motor, and may vary the fraction based on engine, vehicle, or battery operating conditions. Curve 703 illustrates one example of engine torque compensation that may be achieved by adjusting the cylinder air amount. Specifically, the torque response of 703 rises quicker than the response illustrated by curve 705. Consequently, the engine torque may be able to more closely follow the desired torque demand. The trajectory of curve 703 follows the trajectory of curve 705 after the initial torque compensation.

The engine torque response illustrated by curve 705 may be improved by practicing the cylinder air charge compensation method described by FIG. 3 or 6. Namely, the intake air system lag may be compensated so that actuators that may influence cylinder air charge may be controlled to reduce the lag. For example, throttle position of electronic throttle 5 may be adjusted so that intake manifold filling effects may be reduced. This may be accomplished by briefly opening the throttle to a position that is greater than that which would be requested if the torque demand were nearly constant, and then by moving the throttle to the position that meets the torque demand. In other words, during an increase in torque demand, the throttle may be opened to a position that is greater than the position that the throttle would be positioned during a comparable steady state torque demand and then brought back to the steady state position after a period of time. This may allow the intake manifold to fill faster, thereby increasing the amount of air that may be inducted into a cylinder. In another example, the throttle position of electronic throttle 5 and intake valve phaser may be adjusted to further reduce intake manifold filling effects, similarly reducing the engine torque lag. In yet another example, the throttle position of electronic throttle 5 and the timing of randomly activated valves may be adjusted to reduce intake manifold filling effects. In still another example, the valve lift of intake valves in a variable event valvetrain may be adjusted to reduce intake manifold filling effects. The before-mentioned lag reduction methods can also adjust throttle and valve operating parameters in response to torque lag so that a smooth and responsive torque may be produced.

Graph (c) illustrates example motor torque output that may be combined with the engine torque output to allow the powertrain torque to better follow the desired torque request that is shown in graph (a). The motor torque trajectory illustrated by curve 707 represents the amount of motor torque that may be added to the engine torque described by curve 703 to follow the desired torque of curve 701. In other words, the engine air amount and motor torque may be adjusted together so that the desired torque demand may be achieved. This curve illustrates that less motor torque is required to meet desired torque when engine torque is compensated. Consequently, less battery energy may be needed by the motor when air charge compensation is provided for the engine. On the other hand, curve 709 represents the amount of motor torque that may be added to the engine torque described by curve 705 so that the desired torque of curve 701 may be followed. In other words, more motor torque may be required to follow the desired wheel torque if engine torque is not compensated. Further, as the engine boost pressure increases or decreases during transient operating conditions, more or less engine torque may be produced so that less battery power may be necessary to meet the desired torque request. By adjusting the motor torque in response to engine boost pressure or other turbo charger operating conditions (e.g., turbine temperature, compressor air flow rate, and/or turbine speed), it may be possible to use less motor torque during transient operating conditions.

Graph (d) illustrates an example engine air amount during the example period. Locations 709, 710, and 711 show examples of how compensation may affect air flow into the engine. At each of these locations the air charge increases and then falls back to a level that may be more indicative of the steady state torque demand. This effect may be accomplished by opening the throttle beyond the predetermined steady state throttle position and then bringing it back to the steady state command position. In other words, the throttle opening amount is adjusted in response to the dynamic conditions of the engine and torque request so that the desired response may be achieved.

As will be appreciated by one of ordinary skill in the art, the routines described in FIGS. 2 and 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method to improve engine torque response of a hybrid vehicle powertrain, the hybrid powertrain comprising an internal combustion engine that may be coupled to a motor, the internal combustion engine having a compressor coupled thereto, the method comprising:

compensating transient compressor lag by adjusting the state of an air charge altering device; and adjusting a motor output torque delivered to a vehicle driveline to further compensate for said compressor lag, said adjustment to said motor output torque limited by motor speed; where adjustments of the air charge altering device and the motor output torque are based on compressor operation at least during the transient condition, and where adjustments of the air charge altering device and the motor output torque are coordinated to one another to meet desired torque output requested by the operator, the coordination including increasing the air charge adjustment and reducing the motor output torque adjustment in a first state, and the coordination including decreasing the air charge adjustment and increasing the motor output torque adjustment in a second state.

2. The method of claim 1 further comprising adjusting said motor output torque in response to the operator request.

3. The method of claim 1 wherein said compressor operation is an output pressure of said compressor.

4. The method of claim 1 wherein said compressor operation is an output flow rate of said compressor.

5. The method of claim 1 wherein said compressor is a turbo charger, the method further comprising varying relative adjustment amounts of the air charge altering device and motor torque based on a state of battery charge, where motor torque provides less transient turbo lag torque compensation at lower battery charge.

6. The method of claim 1 wherein said compressor is a super charger.

7. The method of claim 1 wherein said motor is an electric motor, and wherein the air charge altering device is adjusted at a lower rate of change when compressor lag is a first lag value and cylinder load is a first load value, than when compressor lag is a second lag value and cylinder load is a second load value, said second lag value and said second load value being respectively smaller than said first lag value and said first load value.

8. The method of claim 1 wherein said motor is a hydraulic motor.

9. A method to improve engine torque response of a hybrid vehicle powertrain, the hybrid powertrain comprising an internal combustion engine that may be coupled to a motor, the internal combustion engine having a compressor coupled thereto, the method comprising:

in response to an increasing torque demand, increasing airflow to a cylinder of the engine by adjusting cylinder valve timing operation and increasing a motor torque output from said electric motor to a vehicle driveline, the airflow and motor torque output being coordinated to one another to compensate compressor delay, the cylinder valve timing operation based on an operating condition of said compressor, and the magnitude of said increase in torque output based on the operating condition of said compressor and engine valve timing, wherein the coordination includes a greater airflow increase and a smaller motor torque output increase in a first motor torque capacity state, and wherein the coordination includes a smaller airflow increase and a greater motor output torque increase in a second higher motor torque capacity state.

10. The method of claim 1 further comprising adjusting the duration of said torque output in response to an operating condition of said engine.

11. The method of claim 1 further comprising adjusting the duration of said torque output in response to an operating condition of said motor.

12. The method of claim 9 wherein said motor is an electric motor, and wherein the valve timing is adjusted at a higher rate of change when compressor lag is a first lag value and cylinder load is a first load value, and the valve timing is adjusted at a lower rate of change when compressor lag is a second lag value and cylinder load is a second load value, said second lag value being smaller than said first lag value and said second load value being greater than said first load value.

13. The method of claim 9 wherein said motor is a hydraulic motor.

14. The method of claim 9 wherein said compressor is a turbo charger.

15. A method to improve engine torque response of a hybrid vehicle powertrain, the hybrid powertrain comprising an internal combustion engine that may be coupled to a motor, the internal combustion engine having a compressor coupled thereto, the method comprising:

adjusting at least a cylinder air amount by adjusting valve timing and adjusting a motor output torque to compensate for a transient compressor lag, said cylinder air amount and said motor torque adjusted in response to a compressor operating condition, wherein the cylinder air amount and the motor output torque are adjusted in coordination to each other to achieve a desired torque output requested by an operator, the coordination including a greater transient increase of the cylinder air amount and a smaller transient increase of the motor output torque in a first battery charge state than in a second higher battery charge state.

16. The method of claim 15 wherein said adjusting at least a cylinder air amount is accomplished by controlling the position of an electrically actuated throttle.

17. The method of claim 15 wherein said adjusting at least a cylinder air amount is accomplished by controlling the opening timing of an intake valve.

18. The method of claim 1 wherein said motor is an electric motor, and wherein the air charge altering device is adjusted at a lower rate of change when compressor lag is a first lag value and cylinder load is a first load value, than when compressor lag is a second lag value and cylinder load is a second load value, said second lag value and said second load value being respectively greater than said first lag value and said first load value.

* * * * *